No. 716,520. Patented Dec. 23, 1902.
J. W. COLE.
PULLEY POWER AND MOTION TRANSMISSION.
(Application filed June 21, 1902.)
(No Model.)
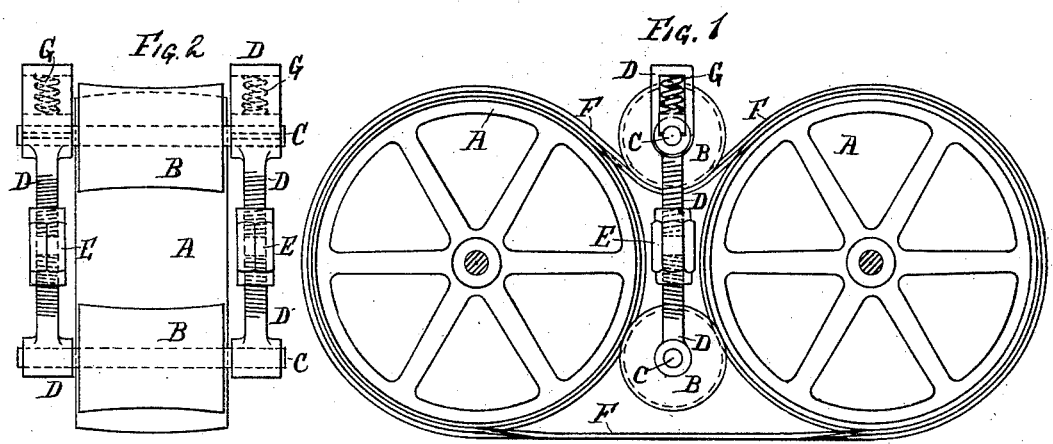
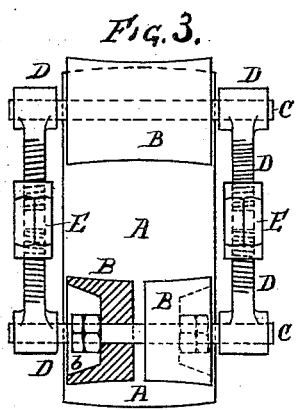
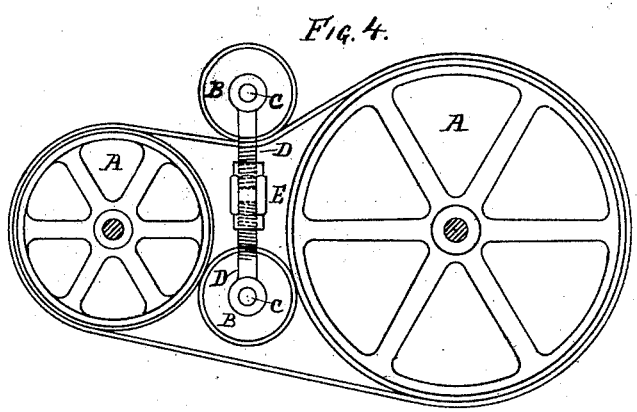
WITNESSES:
W. H. Edgerley
Frederic Allart
INVENTOR:
James W. Cole
by Wm. H. Weightman
atty

UNITED STATES PATENT OFFICE.

JAMES WENDELL COLE, OF COLUMBUS, OHIO.

PULLEY POWER AND MOTION TRANSMISSION.

SPECIFICATION forming part of Letters Patent No. 716,520, dated December 23, 1902.

Application filed June 21, 1902. Serial No. 112,693. (No model.)

*To all whom it may concern:*

Be it known that I, JAMES WENDELL COLE, a citizen of the United States, residing in the city of Columbus, Franklin county, and State of Ohio, have invented certain new and useful Improvements in Pulley Power and Motion Transmission, of which the following is a specification, reference being had to the accompanying drawings.
My invention relates specially to improvements in pulley practice, whereby the connected pulleys may be located in comparatively close juxtaposition and the space occupied for belting transmission of power and motion reduced to a minimum and whereby is accomplished an ultraeffective transmission from pulley to pulley or through a series of pulleys, by means of which an economy of space and an efficiency of service is effected and accomplished and a maximum of power and motion is transmitted from the origin of power and motion to all connected machinery, counter-shafts, and line-shafts, as may be desired.
Certain of my improvements consist in the special application to closely-situated driving and driven pulleys and their connecting-belting of a plurality of self-supporting and adjustably-connected pressure-pulleys, so arranged and located that one of them shall wear upon the adjacent faces of both driving and driven pulleys, while the other wears upon the connecting-belting, as a means for an assured maximum transmission of motion for power purposes.

Other improvements consist in the special application to closely-situated driving and driven pulleys and their connecting-belting of a plurality of self-supporting and adjustably-connected pressure-pulleys so arranged and located that one of them shall wear upon the connecting-belting, while the other wears upon the adjacent faces of both driving and driven pulleys, this latter being divided and provided with means of adjustment upon the shaft of said divided pulley, whereby the portions of said divided pulley may be brought together or set farther from each other to secure a closer contact and neater fit of the several adjacent faces.

Other improvements consist in the special construction, arrangement, and combination of the several parts, portions, or details comprising the mechanism, as may be hereinafter set forth.

Similar letters of reference designate like parts or portions in all the figures.

Figure 1 represents an outline elevation of pulleys for power and motion transmission provided with a friction and belt-tightening device embodying my improvements. Figs. 2 and 3 represent detail elevations of the friction and belt-tightening pulleys provided with a housing and means for the adjustment, control, and elasticity of the same. Fig. 4 represents an outline elevation of pulleys for power and motion transmission, said pulleys being shown of different diameters and provided with a friction and belt-tightening device embodying my improvements.

Letter A designates the pulleys for receiving or transmitting the power, set in close proximity to each other.

Letter B designates the several pulleys of the improved device or attachment made use of for either friction or belt-tightening purposes.

Letter C designates the cross-shafts for carrying the friction or belt-tightening pulleys of the device.

Letter D designates the connecting-links for adjusting the position and relation of the friction or belt-tightening pulleys with reference to each other and to the faces or belts of the power-transmission pulleys.

Letter E designates turnbuckles or their equivalents by means of which the several connecting-links D are lengthened or shortened and the cross-shafts C and pulleys B are brought to a bearing upon the main pulleys A or upon the connecting-belting F.

Letter G designates relieving springs or cushions acting in connection with the links D to secure an elastic and automatic take-up or release of the friction or belt-tightening pulleys in case of sudden or varying strains.

Local contact and controlled friction between the main pulleys A and pulleys B and between belting F and pulleys B are brought about by the shortening of connecting-links D, the lower pulleys B coming in contact with, pressing against, and wearing upon the adjacent faces of the main pulleys A, the upper pulleys B pressing against and wearing upon the connecting-belting F to bring it down upon and increase its contact with the main pulleys A.

In Figs. 1, 2, and 3 pulleys B are shown concave on the face to suit the crown of the larger pulley-faces. In Fig. 3 these concave pulleys B are shown divided to secure a face adjustment of greater scope than when the pulleys are not divided. The two portions or halves are by means of the adjustment-nuts $b$ set farther apart or closer together to grasp the curved faces of the larger pulleys to a more efficient contact and friction purpose.

What I claim as new, and desire to secure by Letters Patent, is—

1. In a power and motion transmitting mechanism, in combination with the driving and driven pulleys and their connecting-belting, a plurality of self-supporting and adjustably-connected pressure-pulleys, one adapted to wear upon the adjacent faces of both driving and driven pulleys, the other to wear upon the connecting-belting, substantially as and for the purposes set forth.

2. In a power and motion transmitting mechanism, in combination with the driving and driven pulleys and their connecting-belting, a plurality of self-supporting and adjustably-connected pressure-pulleys, one of which is adapted to wear upon the connecting-belting, the other to wear upon the adjacent faces of both driving and driven pulleys, the latter being divided and provided with adjustment-nuts upon the shaft of said divided pulley, whereby the portions of said divided pulley may be set closer together or farther apart substantially as and for the purposes set forth.

JAMES WENDELL COLE.

Witnesses:
JOHN J. STODDART,
MABEL A. CRAWFORD.